United States Patent [19]

Ullman, Jr.

[11] 4,258,464
[45] Mar. 31, 1981

[54] METHOD OF FORMING FASTENING SYSTEM

[75] Inventor: Myron E. Ullman, Jr., Canfield, Ohio

[73] Assignee: M.M.G., Inc., Youngstown, Ohio

[21] Appl. No.: 970,390

[22] Filed: Dec. 18, 1978

Related U.S. Application Data

[62] Division of Ser. No. 806,698, Jun. 15, 1977, abandoned.

[51] Int. Cl.³ .............................................. B23P 19/00
[52] U.S. Cl. .................. 29/526 R; 144/220; 248/222.4; 403/409
[58] Field of Search ............. 29/432, 526 R; 403/409; 144/218, 220; 248/222.4

[56] References Cited

U.S. PATENT DOCUMENTS

| | | | |
|---|---|---|---|
| 383,589 | 5/1888 | Parry | 144/220 |
| 706,070 | 8/1902 | Kopp | 403/409 |
| 1,316,959 | 9/1919 | Keiser | 144/220 UX |
| 2,354,639 | 7/1944 | Seymour | 144/218 X |
| 2,675,036 | 4/1954 | Nelsen | 144/220 |
| 3,112,563 | 12/1963 | Kamborian et al. | 29/432 |
| 3,330,518 | 7/1967 | Adler | 29/526 R X |

*Primary Examiner*—Charlie T. Moon
*Attorney, Agent, or Firm*—David A. Burge

[57] ABSTRACT

A fastening system utilizes a tapered plug configured to be matingly received in an elongate, buttonhole-like slot. The slot has an enlarged receiving portion into which the tapered plug can be axially inserted, and a narrower retaining portion having a cross-section which tapers in correspondence with the taper of the plug to establish a snug, secure connection. The retaining portion has an undercut end region which matingly engages a maximum of surface area of the tapered plug to establish a connection which will transmit relatively heavy tension, compression and shear loadings as well as bending moments. The plug is preferably molded from plastics material. The slot is preferably formed using a rotating cutter.

12 Claims, 15 Drawing Figures

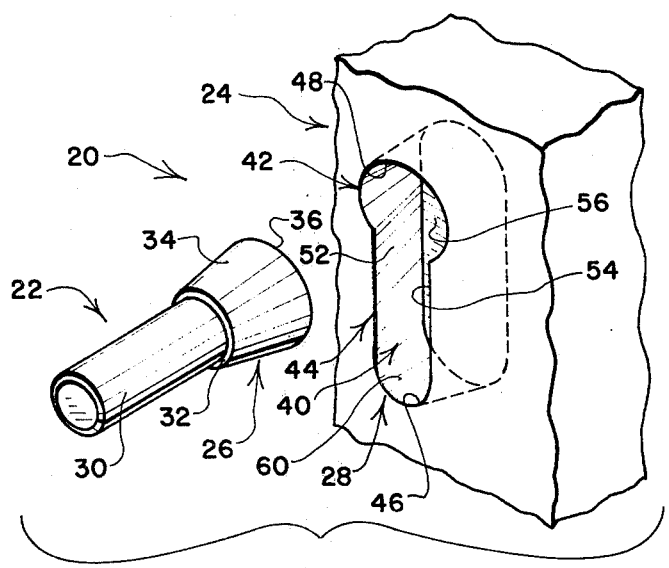
FIG. 1
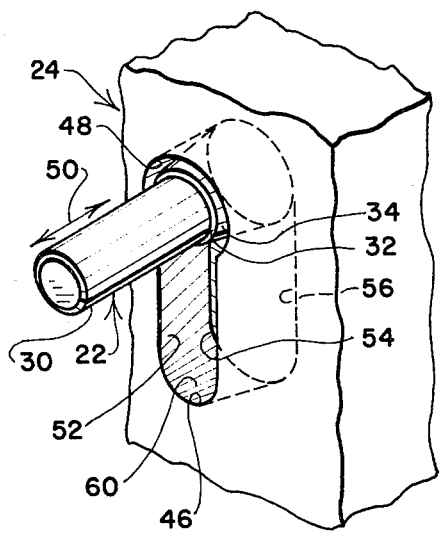
FIG. 2
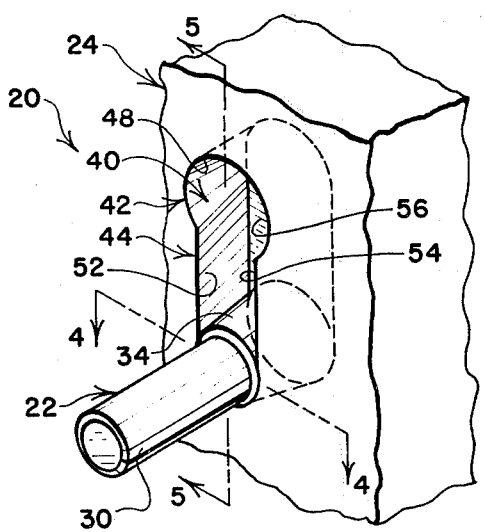
FIG. 3
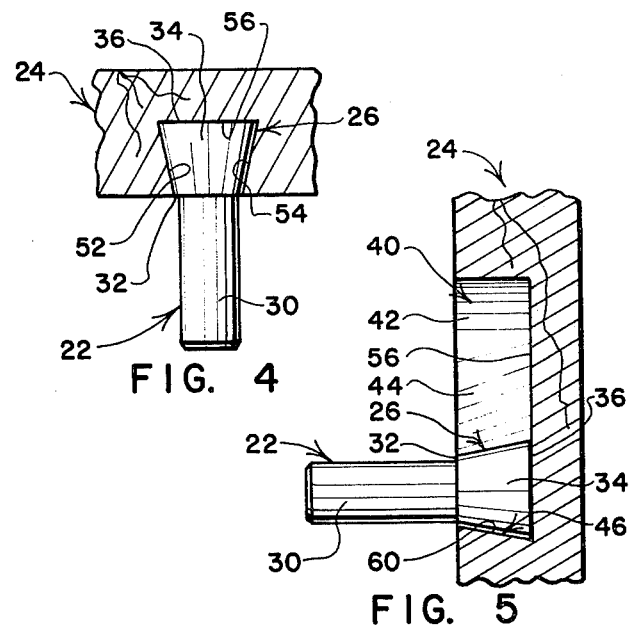
FIG. 4
FIG. 5
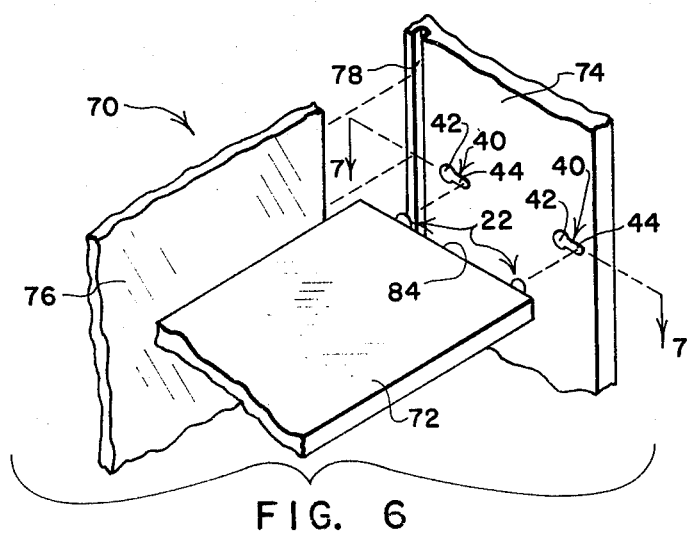
FIG. 6
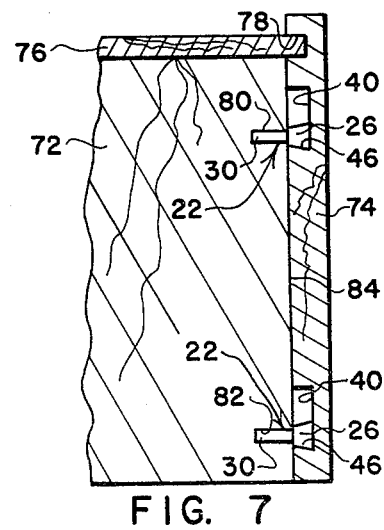
FIG. 7

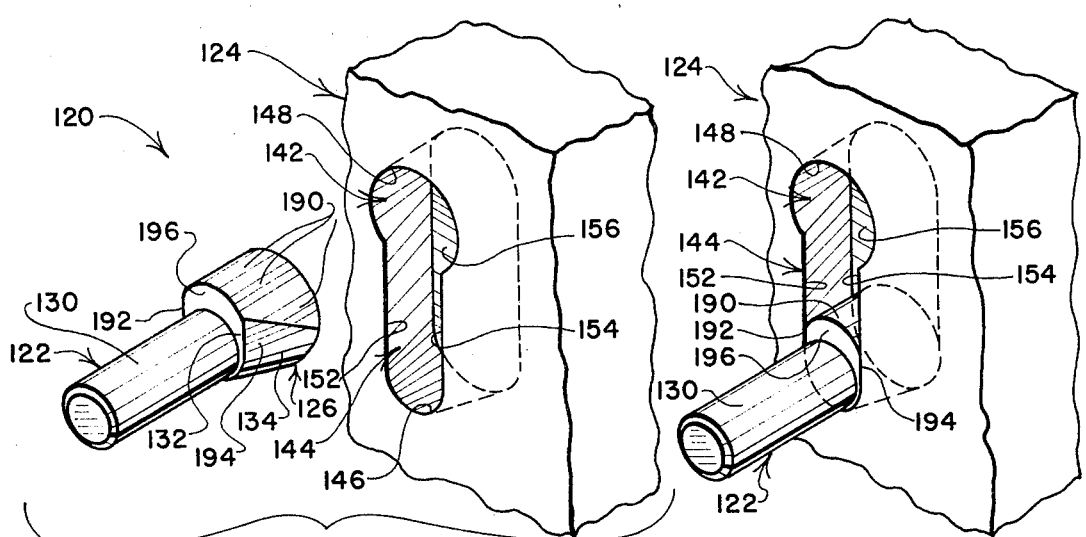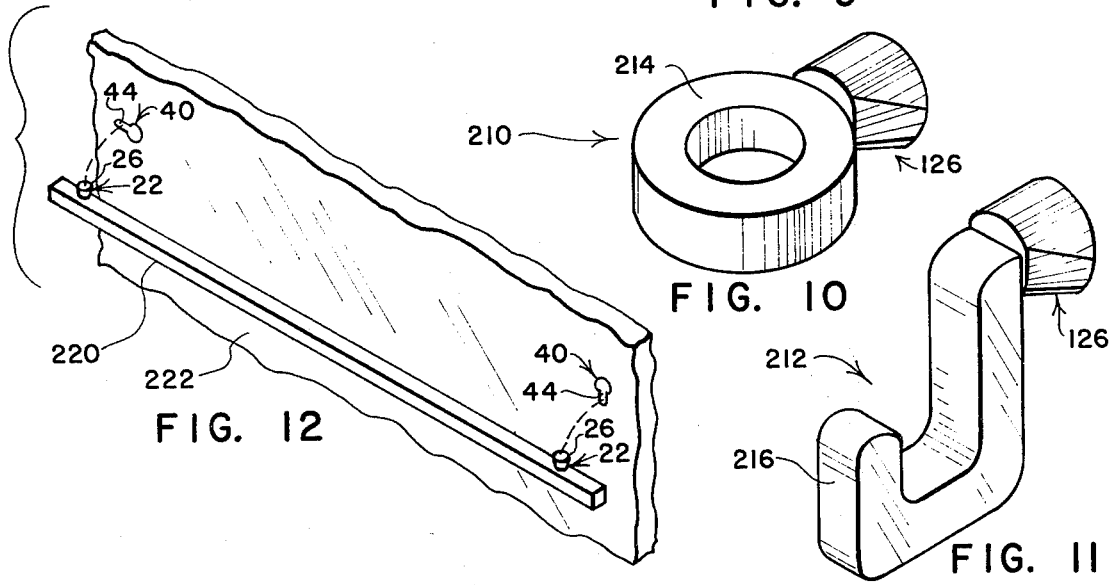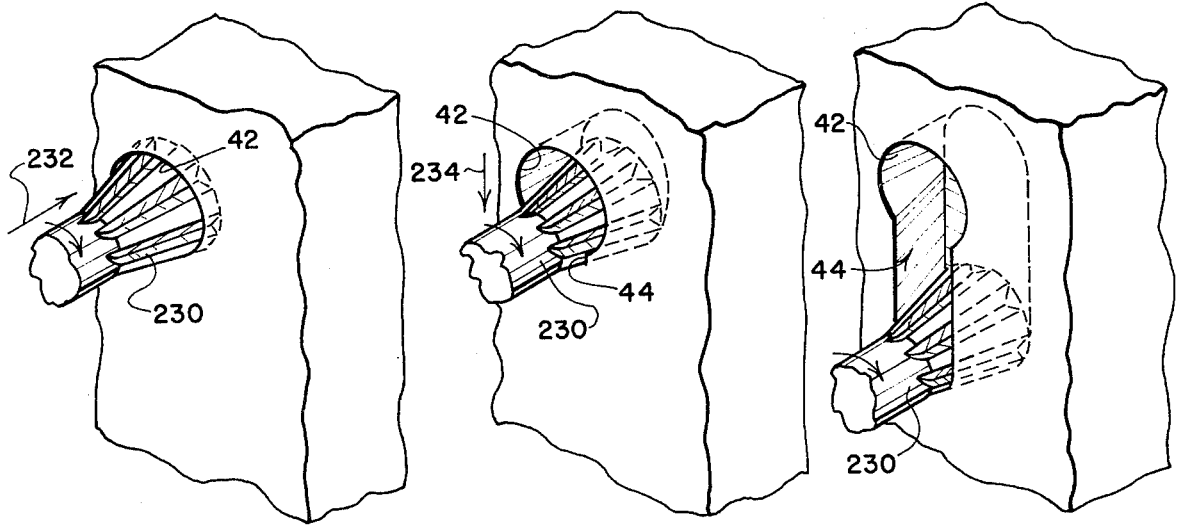

METHOD OF FORMING FASTENING SYSTEM

CROSS REFERENCE TO RELATED APPLICATION

This is a division of application Ser. No. 806,698 filed June 15, 1977, now abandoned.

BACKGROUND OF THE INVENTION

1. Field of the Invention

The present invention relates generally to fastening systems for connecting members together, and, more particularly, to a novel and improved fastening system utilizing a tapered plug configured to be matingly received in a slot having a correspondingly tapered cross-sectional configuration.

2. Prior Art

Proposed fastening systems include the use of dowel pins, the use of screws having heads received in keyhole-shaped slots, and the use of various types of undercut interfitting formations such as dovetail projections extending into dovetail slots.

Some proposed fastenings systems are undesirable because they require the use of bonding materials at the final assembly site. Some proposals are undesirable because they result in the formation of a permanent rather than a disassemblable connection. Some fastening system proposals require the formation of slots which are difficult to form. Some proposed fastening systems provide connections which are undesirably loose and/or loosen when subjected to substantial loadings over significant periods of time. Some proposed fastening systems require the removal of large amounts of structural material from the vicinity of joints, resulting in assemblies which are structurally weakened in the vicinity of their joints. Many proposed fastening systems are deficient in their abilities to transmit a combination of tension, compression and shear loadings as well as bending moments.

Where proposed fastening systems provide releasable connections that do function properly over extended periods of time, they have characteristically been unacceptably expensive for use in many applications, have required that their components be relatively located with great accuracy, and/or have required the use of expensive drilling, doweling or gluing jigs.

SUMMARY OF THE INVENTION

The present invention overcomes the foregoing and other drawbacks of prior art proposals by providing a novel and improved fastening system employing a tapered plug which is received in a slot having a correspondingly tapered cross-section.

In accordance with the preferred practice of the present invention, a plug formation is provided on one of two structures to be joined, a socket formation is provided on the other of the structures, and the plug formation is inserted into the socket formation to establish a connection between the structures. A significant feature of the invention lies in the relatively large surface areas which are brought into mating engagement to establish a tight-fitting connection that will adequately transmit substantial tension, compression, and shear loadings as well as bending moments.

Other features of the fastening system lie in the simplicity of its component parts, the ease with which its socket formation can be formed using a rotating cutter, the ease with which components employing its formations can be assembled without the use of tools, and its versatility of application.

The plug formation has portions which taper and diminish in width and perimeter as they extend generally in a given direction away from an end region of the plug formation. The socket formation defines an elongate slot having an enlarged receiving portion and a narrower retaining portion. The receiving portion is configured to receive the plug formation when the structures carrying the plug and socket formations are moved relative to each other in a direction paralleling the given direction to insert the plug formation into the receiving portion. The retaining portion is configured to receive the plug formation when the structures are moved relative to each other in a direction transverse to the given direction after the plug formation has been inserted into the receiving portion. The retaining portion is undercut and has a substantially uniform cross-sectional configuration along its length. Opposite sides of the retaining portion are defined by sidewalls which taper to define a slot portion which increases in width with slot depth. The sidewalls are configured to snugly, matingly engage the tapered portions of the plug formation. The retaining portion terminates at one end of the slot and has an end wall which is undercut and configured to matingly engage the tapered portion when the tapered portions are positioned in one end of the slot.

The end region of the plug formation is preferably flat and is preferably matingly engaged by a flat bottom wall of the slot when the tapered portions of the plug are received in the retaining portion of the slot. The end wall of the retaining portion is preferably semi-frustoconical in shape and matingly engages frustoconically-shaped tapered portions on the plug portion. The relatively large matingly engaging surface areas provided by the tapered portions and the end wall of the plug formation, and by the tapered end wall and the bottom wall of the socket formation, establish a snugly fitting connection capable of transmitting relatively large tension, compression and shear loads, as well as bending moments.

The receiving portion of the slot is preferably cylindrical. The largest perimeter portion of the tapered plug formation is preferably round and has a diameter which will let the plug formation be inserted snugly into the receiving portion. A part of the tapered portion of the plug formation may include flat sidewall portions configured to matingly engage the sidewalls of the retaining portion of the slot. A part of the tapered portion may also be cylindrical, having a diameter which will let the plug formation be inserted snugly within the receiving portion. At least about half of the perimeter of the tapered portions of the plug formation is preferably of frustoconical shape to enable this part to matingly engage the semi-frustoconical end wall of the retaining portion of the slot. In one embodiment, the entire perimeter of the tapered portions is of frustoconical shape.

The plug formation can be formed integrally with one of two structures to be interconnected, or can be bonded or otherwise fastened to this structure. The plug formation is preferably molded from relatively rigid plastics material such as high impact polystyrene, but can also be formed from other rigid materials such as metal.

The socket formation can be formed in a separate member which is bonded or otherwise fastened to the other of two structures to be interconnected, but is preferably formed within such other structure using a rotating cutter.

The fastening system of the present invention is well adapted for use in connecting shelves to uprights, and in supporting brackets, drawer guides and the like on uprights. Structures to be interconnected can be provided with two or more sets of plug and socket formations. The longitudinal dimensions of the socket formation slots can be arranged to extend in parallel, in a common line, or perpendicular to each other, depending on the nature of the installation. As such, the fastening system is highly versatile and is well adapted for many different applications.

The fastening system of the present invention is particularly well adapted to form connections between structures formed of fibrous or particle board materials since the relatively large surface areas of engagement established between interfitting formations of the system operate to distribute loadings and to prevent loading concentrations that could damage material portions in the vicinity of the plug and socket formations. Moreover, since the socket formations require the removal of a minimal amount of material during their formations, the resulting assembly is not significantly weakened in the vicinity of its joints.

As will be apparent from the foregoing summary, it is a general object of the present invention to provide a novel and improved fastening system for connecting a pair of structures.

It is a further object to provide a plug and socket fastening system which will transmit relatively large loads and bending moments and which will distribute these loadings over relatively large surface areas to permit the system to be used effectively to join structures formed of fibrous and/or particle board materials.

These and other objects and a fuller understanding of the invention described and claimed in the present application may be had by referring to the following description and claims taken in conjunction with the accompanying drawings.

BRIEF DESCRIPTION OF THE DRAWINGS

FIG. 1 is an exploded perspective view showing elements of a fastening system embodying features of the present invention;

FIG. 2 is a perspective view similar to FIG. 1 showing the elements during an intermediate stage of their assembly;

FIG. 3 is a perspective view similar to FIG. 2 showing the elements in their final assembled position;

FIGS. 4 and 5 are sectional views as seen from planes indicated by lines 4—4 and 5—5 in FIG. 3;

FIG. 6 is an exploded perspective view of elements of a cabinet construction employing a fastening system embodying features of the present invention;

FIG. 7 is a sectional view as seen substantially from a plane indicated by a line 7—7 in FIG. 6 following assembly of the cabinet construction components;

FIGS. 8 and 9 are perspective views similar to FIGS. 1 and 3 of an alternate embodiment of a fastening system including features of the present invention;

FIGS. 10 and 11 are perspective views illustrating applications of the fastening system of FIGS. 8 and 9;

FIG. 12 is an exploded perspective view illustrating the use of fastening systems of the present invention in the mounting of a drawer guide on an upright; and FIGS. 13, 14 and 15 are perspective views illustrating the manner in which elongate slots employed in the fastening system of the present invention are formed using a rotating cutter.

DESCRIPTION OF THE PREFERRED EMBODIMENT

Referring to FIG. 1, one embodiment of a fastening system including features of the present invention is indicated generally by the numeral 20. The fastening system 20 includes a pair of structures 22, 24. A plug formation 26 is provided on the structure 22. A socket formation 28 is provided on the other structure 24.

The structure 22 has an elongate, cylindrical mounting shank 30 separated by an annular shoulder 32 from the plug formation 26. The plug formation 26 has tapered portions 34 which diminish in width and perimeter as they extend away from an end wall 36 toward the shoulder 32. In the embodiment of FIG. 1, the tapered portions 34 are of frustoconical shape. The shoulder 32 and the end wall 36 extend in spaced parallel planes which orthogonally intercept the axis of the cylindrical mounting shank 30.

The socket formation 28 defines an elongate, buttonhole-type slot 40 having an enlarged receiving portion 42 and a narrower retaining portion 44. The retaining portion 44 extends from the receiving porton 42 to a slot end 46. The receiving portion 42 has a cylindrical inner wall 48 which forms the other end of slot 40. The cylindrical inner wall 48 has a diameter which corresponds closely to that of the diameter of the frustoconical plug formation 26 at its juncture with the end wall 36.

Referring to FIG. 2, the plug formation 26 is insertable into the receiving portion 42 by aligning the axis of the mounting shank 30 with the axis of the cylindrical inner wall 48, and by then effecting relative movement of the structures 22, 24 in a direction paralleling that of the aligned axes. The required relative movement of the structures 22, 24 can, of course, be effected by moving either of the structures 22, 24 toward the other, or by moving both of the structures 22, 24 toward each other in directions indicated by an arrow 50.

Referring to FIGS. 3-5, the retaining portion 44 is configured to snugly, matingly receive the tapered plug formation 26 when the structures 22, 24 are relatively moved in a direction paralleling the length of the elongate slot 40 after the plug formation 26 has been inserted into the receiving portion 42. The required relative movement of the structures 22, 24 is in a direction transverse to the axis of the mounting shank 30 and can, of course, be effected by moving either of the structures 22, 24, or by moving both of the structures to position the plug formation 26 in the slot end 46.

The retaining portion 44 is undercut and has a pair of sidewall portions 52, 54 which taper to define an undercut slot portion which increases in width with slot depth. The sidwall portions 52, 54 taper in a manner corresponding to the tapered configuration of the tapered portions 34 of the plug formation 26 so that the plug formation 26 is snugly, matiningly received in the retaining portion 44. The slot 40 has a bottom wall 56 which engages the end wall 36 of the plug formation 26 to maximize the surface area of engagement between the structures 22, 24.

The slot end 46 is undercut and has an end wall 60 of semi-frustoconical shape configured to matingly engage one half of the periphery of the frustoconical shaped plug formation 26 when the plug formation 26 is in the slot end 46. The engagement established between the end wall 60 and the tapered portions 34, and between the bottom wall 56 and the plug end 36, assures that the structure 22 is snugly connected to the structure 24 when the plug formation 26 is in the slot end 46, and assures that significant bending moments, as well as tension, compression and shear loadings can be transmitted between the structures 22, 24.

In preferred practice, the dimensions of the plug formation 26 and of the elongate slot 40 are selected so that there is a slight interference fit between the structures 22, 24 as the plug formation 26 is inserted into the slot 40. The tapers of the plug portions 34, of the sidewalls 52, 54 and of the end wall 60 are identical, and preferably have a selected angle of taper within the range of about 9 to 13 degrees as measured relative to the axis of the mounting shank 30. The distance between the parallel planes of the shoulder 32 and the end wall 36 is preferably selected to be identical to that of the depth of the slot 40, whereby the shoulder 32 extends flush with such portions of the structure 24 as define the mouth of the slot 40.

Referring to FIGS. 6 and 7, the fastening system 20 is particularly well adapted for use in connecting components of a cabinet structure 70. The cabinet structure includes a shelf 72, an upright 74, and a back 76. A longitudinally extending groove 78 is provided in the upright 74 to receive one end of the back 76. The components 72, 74, 76 are preferably formed from fibrous material such as wood or from preferably formed from fibrous material such as wood or from particle board.

A pair of mounting holes 80, 82 are formed in one end of the shelf 72 and open through a shelf end surface 84. A pair of the structures 22 have their mounting shanks 30 press-fitted into the mounting holes 80, 82. The shoulders 32 of the structures 22 engage the shelf end surface 84 and serve to accurately locate the structures 22 when they are installed on the shelf 72. Any suitable, commercially available adhesive may be used to bond the mounting shanks 30 to the shelf 72.

A pair of the elongate slots 40 are formed in the upright 74. The slots 40 are preferably arranged with their longitudinal dimensions extending along a common line, and with their receiving portions 42 being located closer to the groove 78 than are their retaining portions 44. The mounting holes 80, 82 and the slots 40 are located such that each of the structures 22 can be simultaneously inserted into a separate one of the slots 40, and can be simultaneously moved to positions where the plug formations 26 are recieved in the slot ends 46. The groove 78 is located such that, once the structures 22 are positioned in the slots 40 as shown in FIG. 7, the back 76 can be inserted into the groove 78 to prevent the shelf 72 and the upright 74 from relatively moving, whereby the plug formations 26 are retained in the slot ends 46 with the tapered portions 34 in mating engagement with the tapered end walls 60 of the slots 40.

Referring to FIGS. 8 and 9, an alternate embodiment of a fastening system including features of the invention is indicated generally by the numeral 120. The fastening system 120 includes a pair of structures 122, 124. A plug formation 126 is provided on the structure 122. A socket formation 128 is provided on the other structure 124.

The fastening system 120 differs from the fastening system 20 only in the configuration of the plug formation 126. The socket formation 128 is identical to the socket formation 28. Identical elements of the fastening systems 120, 20 are indicated by numerals which differ from each other by the number 100.

The plug formation 126 is much like the plug formation 26 in that it has tapered portions 134 which diminish in width and perimeter as they extend away from an end wall 136 toward a shoulder 132. The plug formation 126 is unlike the plug formation 26 in that the tapered portions 134 include cylindrical wall portions 190 which have the same radius as the round end wall 136. The tapered portions 134 also include planar sidewall portions 192, 194 which are configured to matingly engage the sidewall portions 152, 154 of the retaining portion 144. The plug formation 126 also differs from the plug formation 26 in that its shoulder 132 is not annular but rather has an enlarged portion 196 adjoining the cylindrical wall portion 190.

A feature of the fastening system 120 is that the plug formation 126 will not turn in the elongate slot 140 once the sidewall portions 192, 194 have been received between the sidewall portions 152, 154 of the retaining portions 144. Still another feature of the fastening system 120 is that the increased area of engagement provided between the connected structures 122, 124 by the mating engagement between the sidewall portions 192, 194 and the sidewall portions 152, 154 facilitates the transmission of greater tension, compression and shear loadings as well as bending moments between the structures 122, 124. Still another feature of the fastening system 120 is the increased size of the locating shoulder 192. When the structure 122 is mounted on a shelf end, as described in conjunction with FIGS. 6 and 7, the locating shoulder 192 provides a larger area of surface engagement with the shelf end surface than does the shoulder 32. For these reasons, the mountings system 120 is preferred in many installations.

Typical installations where the mounting system 120 is preferred over the mounting system 20 are illustrated in FIGS. 10 and 11 where tool support brackets 210, 212 are shown. The brackets 210, 212 have conventional eye and hook formations 214, 216 configured to support tools and the like on an upright tool board, not shown. The brackets 210, 212 have integrally formed plug formations 126 which are intended to be inserted in vertically extending elongated slots 140 formed in an upright tool board. While the plug formations 26 could be used on the brackets 210, 212, in place of the plug formations 126, the formations 126 are preferred because they will not turn in the slots 140 and because they are capable of handling heavier loadings than are the formations 26.

An installation where the mounting system 20 is preferred over the mounting 120 is illustrated in FIG. 12 where a drawer guide member 220 is to be mounted on an upright 222. In the installation of FIG. 12, a pair of the structures 22 are provided on the drawer guide 220, and a pair of the elongated slots 40 are provided in the upright 222. The slots 40 are arranged with their longitudinal dimensions extending at right angles to each other. The drawer guide 220 is mounted on the upright 222 by first inserting the left one of the plug formations 26 into the left slot 40 and by moving the left plug formation into the retaining portion 44 of the left slot 40, whereafter the right one of the plug formations 26 is inserted into the right slot 40 and is moved into the retaining portion 44 of the right slot 40. Since the left plug formation 26 must turn in the left slot 40 during insertion of the right plug formation 26 into the right slot 40, the mounting system 20 is preferred in this installation to the mounting system 120. As will be appreciated, however, the mounting system 120 could be used in this installation if the drawer guide 220 is sufficiently flexible to permit insertion of the right plug formation 26 into the right slot 40.

Any suitable means can be used to connect the plug formations 26, 126 to their supporting structures. In the foregoing description, two such connections systems are described, one employing mounting shanks which are pressed into mounting holes, and the other employing plug formations which are formed integrally with their supporting structures. Still other systems of connection with be apparent to those skilled in the art. One example is the use of retaining washers or other fasteners which bite into the mounting shanks 30, 130. Another approach is to "stake" the mounting shanks in place as by heating their ends to form enlargements thereon after the shanks have been inserted through holes formed in their associated supporting structures.

Referring to FIGS. 13-15, the elongate slots 40, 140 are preferably formed quite simply using a rotating cutter 230. The cutter 230 is preferably a conventional dovetail cutter and is used to form a slot 40 by first moving its cutting end axially into engagement with the structure 24 to form the receiving portion 42 of a slot 40, as indicated by an arrow 232 in FIG. 13. Once the receiving portion 42 is formed, the rotating cutter 230 is moved transversely, as indicated by an arrow 234 in FIG. 14 to form the retaining portion 44, as shown in FIG. 15. Once both of the receiving and retaining portions 42, 44 have been formed, the transverse and axial movements of the rotating cutter 230 are reversed to remove the cutter 230 from the slot through the receiving portion 42.

As will be apparent from the foregoing description, the present invention provides a simple and inexpensive-to-fabricate fastening system having a wide variety of uses. When the plug and socket formations of the system are brought into interfitting engagement, they are operative to provide secure, tight-fitting connections capable of transmitting relatively high loadings of all types, including tension, compression and shear loadings as well as bending moments.

Although the invention has been described in its preferred form with a certain degree of particularity, it is understood that the present disclosure of the preferred form has been made only by way of example and numerous changes in the details of construction and the combination and arrangement of parts may be resorted to without departing from the spirit and scope of the invention as hereinafter claimed. It is intended that the patent shall cover, by suitable expression in the appended claims, whatever features of patentable novelty exist in the invention disclosed.

What is claimed is:

1. A method of forming a connection between first and second structures, comprising the steps of:
   (a) providing a pin having a plug formation with portions diminishing in width and perimeter as they extend generally in a given direction away from an end region of the plug formation, a shank extending outwardly of the plug formation on that side of the plug formation opposite the end region, and a flat shoulder at the interface between the plug formation and the shank;
   (b) forming a shank-receiving opening in the first structure;
   (c) inserting the shank of the pin into the opening in the first structure and continuing insertion until such time as the flat shoulder engages the surface of the first structure in the area surrounding the opening;
   (d) forming an elongate slot in the second structure, the slot having an enlarged portion for receiving the plug formation, and a narrower retaining portion for snugly and matingly engaging the plug formation, the retaining portion being undercut and having a substantially uniform cross-sectional configuration along its length, opposite sides of the retaining portion being defined by wall portions which increase in width with slot depth, the depth of the slot being substantially equal to the length of the plug formation from the shoulder to the end region; and
   (e) connecting the first and second structures by inserting the plug formation into the enlarged receiving portion and thereafter moving the plug formation into the narrower retaining portion.

2. The method of claim 1 wherein the step of providing the second structure with an elongate slot includes the step of forming the elongate slot with rotating cutter.

3. The method of claim 2 wherein the step of forming the slot with a rotating cutter includes the steps of:
   (a) providing a rotating cutter of the type adapted for rotation about an axis and having an end portion configured to form the receiving portion of the slot when the rotating cutter is moved axially into engagement with the second structure, and being configured to form the retaining portion of the slot when the cutter is moved transversely of its axis after having formed the receiving portion;
   (b) moving the rotating cutter axially and then transversely to form the receiving and retaining portions of the slot; and,
   (c) reversing the transverse and axial movements of the rotating cutter to remove it from the formed slot.

4. The method of claim 1 wherein a pair of spaced plug formations of the type described are provided on the first structure, a pair of slots of the type described are provided on the second structure, and during the step of effecting relative movement of the structures, each of the plug formations is moved into receiving engagement with a separate one of the slots.

5. The method of claim 4 wherein the pair of slots extend substantially parallel to each other, and the step of effecting relative movement includes the step of simultaneously inserting each of the plug formations into a separate one of the slots.

6. The method of claim 4 wherein the pair of slots extend substantially perpendicular to each other, and the step of effecting relative movement includes the step of inserting one of the plug formations into one of the slots prior to inserting the other of the plug formations into the other of the slots.

7. The method of claim 1 wherein the step of providing a pin includes the step of molding the plug formation from plastics material.

8. The method of claim 7, wherein the step of providing a pin includes the steps of forming the shank integrally with the molded plug formation.

9. The method of claim 1, wherein the step of providing a pin includes the step of forming the end region as a flat surface, and the step of forming an elongate slot includes the step of providing a flat bottom wall.

10. The method of claim 1, wherein the step of providing a pin includes the step of forming the plug formation in frustoconical configuration having a flat end region positioned perpendicular to the longitudinal axis of the plug formation, and the step of forming an elongate slot includes the step of providing wall portions of the same configuration as the outer surface of the plug formation including a flat bottom wall engageable with the flat end region.

11. The method of claim 1, wherein the step of providing a pin includes the step of providing a plug formation substantially frustoconical throughout at least one-half of its periphery, the non-frustoconical portions terminating at the shank end of the pin in an enlarged flat shoulder, and the step of forming an elongate slot includes the step of providing wall portions of the same configuration as the frustoconical portions of the plug formation.

12. A method of forming a connection between first and second structures, comprising the steps of:
 (a) providing a pin having a plug formation with straight-sided wall portions diminishing in width and perimeter as they extend along a longitudinal axis of the plug formation in a direction away from a flat end region of the plug formation, a shank extending outwardly of the plug formation on that side of the plug formation opposite the end region, and a flat shoulder at the interface between the plug formation and the shank, the shoulder lying in a plane positioned substantially perpendicular to the longitudinal axis of the plug formation;
 (b) forming a shank-receiving opening in the first structure;
 (c) inserting the shank of the pin into the opening in the first structure and continuing insertion until such time as the flat shoulder engages the surface of the first structure in the area surrounding the opening;
 (d) forming an elongate slot in the second structure, the slot having an enlarged portion for receiving the plug formation, and a narrower retaining portion for snugly and matingly engaging the plug formation, the retaining portion being undercut and having a substantially uniform cross-sectional configuration along its length, opposite sides of the retaining portion being defined by wall portions which increase in width with slot depth to provide a retaining portion having a configuration substantially identical to that of the plug formation, the retaining portion including a flat bottom wall engageable with the flat end region of the plug formation, the depth of the slot being substantially equal to the length of the plug formation from the shoulder to the end region; and
 (e) connecting the first and second structures by inserting the plug formation into the enlarged receiving portion and thereafter moving the plug formation into the narrower retaining portion.

* * * * *